(12) United States Patent
Dawson

(10) Patent No.: US 6,836,563 B2
(45) Date of Patent: Dec. 28, 2004

(54) COMPUTER-READABLE MEDIUM AND PROGRAM FOR QUANTIZING A DATA SET, METHOD AND APPARATUS FOR QUANTIZING A DATA SET

(75) Inventor: Thomas Patrick Dawson, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/633,870

(22) Filed: Aug. 4, 2003

(65) Prior Publication Data

US 2004/0101194 A1 May 27, 2004

Related U.S. Application Data

(63) Continuation-in-part of application No. 09/456,143, filed on Dec. 7, 1999, now Pat. No. 6,618,500.

(51) Int. Cl.[7] .............................................. G06K 9/00
(52) U.S. Cl. ...................................... 382/162; 345/600
(58) Field of Search ................................ 382/162–167; 345/589–610

(56) References Cited

U.S. PATENT DOCUMENTS

| 4,169,285 A | 9/1979 | Walker ....................... 345/591 |
| 4,907,075 A | 3/1990 | Braudaway .................. 358/75 |

(List continued on next page.)

FOREIGN PATENT DOCUMENTS

| JP | 02 194773 | 8/1990 | ............ H04N/1/46 |
| JP | 08 286651 | 11/1996 | ............ G09G/5/06 |

OTHER PUBLICATIONS

M. Sakauchi et al., "A flexible and high–speed color image quantization using a 3–D pattern data structure," Applications of Digital Image Processing XII, San Diego, CA USA, Aug. 8–11, 1989, vol. 1153, pp. 640–644, Proceedings of the SPIE—The International Society for Optical Engineering, 1989, ISSN: 0277–786X.

(List continued on next page.)

Primary Examiner—Jingge Wu
(74) Attorney, Agent, or Firm—Mayer Fortkort & Williams, PC; Heather L. Mansfield, Esq.; Karin L. Williams, Esq.

(57) ABSTRACT

A method for receiving and quantizing a data set originating from collected data is provided. The data set has a plurality of dimensions defined by perpendicular axes, and includes a plurality of data points. Each data point has a data characteristic. The method includes the steps of: receiving the data set; selecting a predetermined number of data classes based on a distribution of the data characteristics of the plurality of data points within the data set, the predetermined number of data classes less than the number of data points; forming a data structure based on the predetermined number of data classes; and resolving each of the plurality of data points into one of the predetermined number of data classes using a method, which includes the steps of locating a plurality of region centers within the data set, each region center associated with one of the predetermined number of data classes; representing formation of a plurality of regions within the data set by iteratively expanding a predetermined geometric representation from each region center radially outward, each iteration of expansion of the predetermined geometric representation occurring by an integer unit of measure associated with a data point, the iterative expansion causing adjacent regions to intersect and form region boundaries, the region boundaries permitted to be non-parallel to the perpendicular axes; and after each iteration of expansion, assigning a value to each of the unassigned data points within each region, the assigned value associated with the predetermined data class of a particular region center, the particular region center being the region center associated with the first region to capture the data point during the iterations of expansion. The resolved data points are associated with the data structure, and, using the associated resolved data points, a modified representation of the collected data is generated.

20 Claims, 7 Drawing Sheets

U.S. PATENT DOCUMENTS

| | | | |
|---|---|---|---|
| 5,049,986 A | 9/1991 | Aono et al. | 358/80 |
| 5,365,252 A | 11/1994 | Lo | 345/153 |
| 5,394,518 A | 2/1995 | Friedman et al. | 395/131 |
| 5,398,120 A | 3/1995 | Friedman et al. | 358/501 |
| 5,463,702 A | 10/1995 | Trueblood | 382/239 |
| 5,485,558 A | 1/1996 | Weise et al. | 345/597 |
| 5,506,946 A * | 4/1996 | Bar et al. | 345/600 |
| 5,638,190 A | 6/1997 | Geist | 358/500 |
| 5,734,368 A | 3/1998 | Meyers et al. | 345/593 |
| 5,748,771 A | 5/1998 | Fujiwara | 382/162 |
| 5,793,892 A | 8/1998 | Pan et al. | 382/232 |
| 5,877,754 A | 3/1999 | Keith et al. | 345/601 |
| 6,181,818 B1 | 1/2001 | Sato et al. | 382/170 |
| 6,456,300 B1 | 9/2002 | Pettigrew | 345/634 |
| 6,476,877 B2 * | 11/2002 | Kihara et al. | 348/650 |
| 6,571,012 B1 * | 5/2003 | Pettigrew | 382/167 |
| 6,618,500 B1 * | 9/2003 | Dawson | 382/162 |
| 6,754,399 B2 * | 6/2004 | Pettigrew et al. | 382/276 |
| 6,757,425 B2 * | 6/2004 | Pettigrew et al. | 382/162 |

OTHER PUBLICATIONS

I. Ashdown, "Octree Color Quantization," Copyright 1994, John Wiley & Sons, Inc., pp. 1–7.

* cited by examiner

| Discrete Location | Mapping Value (Upper byte) | Bit Flags (Lower byte) |
|---|---|---|
| (0, 0, 0) | | |
| (0, 0, 1) | | |
| (0, 0, 2) | | |
| ⋮ | | |
| (0, 0, 255) | | |
| (0, 1, 0) | | |
| (0, 1, 1) | | |
| (0, 1, 2) | | |
| ⋮ | | |
| (0, 1, 255) | | |
| (0, 2, 0) | | |
| (0, 2, 1) | | |
| (0, 2, 2) | | |
| ⋮ | | |
| (0, 2, 255) | | |
| ⋮ | | |
| (255, 255, 255) | | |

*FIG. 3A*

| Mapping Value | Display Color |
|---|---|
| 0 | |
| 1 | |
| 2 | |
| 3 | |
| ⋮ | |
| 255 | |

*FIG. 3B*

COMPUTER-READABLE MEDIUM AND PROGRAM FOR QUANTIZING A DATA SET, METHOD AND APPARATUS FOR QUANTIZING A DATA SET

STATEMENT OF RELATED APPLICATION

This application is a Continuation-in-Part and claims the benefit of prior filed copending application Ser. No. 09/456,143, filed Dec. 7, 1999 now U.S. Pat. No. 6,618,500.

BACKGROUND OF THE INVENTION

1. Field of the Invention

Aspects of this invention relate generally to data quantization, and, more particularly to the quantization of data sets originating from collected data.

2. Description of Related Art

It is often desirable to reduce the total number of characteristics of data within a data set originating from collected data, such as the number of colors within a digital color image. Regarding digital color images specifically, raster images are typically composed of a plurality of individual pixels, each pixel having a particular color and location associated with it. The color of the pixel can be expressed in terms of the intensities of three color variables in a color model. Representative color model systems include RGB (red, green, and blue), CMY (cyan, magenta, and yellow), YIQ ("Y" representing luminance and "I" and "Q" representing chromaticity), HSV (hue, saturation, and value), also known as HSB (hue, saturation, and brightness), and HLS (hue, lightness, and saturation).

Using the RGB color model as an example, by defining colors in terms of their red, green, and blue components, all of the colors in the spectrum can be represented as points in a three-dimensional color cube, each axis representing one of the primary colors. The intensity of each color component is normalized to a value between zero and one, zero indicating the complete absence of that component and one indicating full saturation. In a 24-bit true color image, the intensity for each RGB component is stored as an eight bit value, which provides 256 different intensity levels for each primary color, for a total of $2^{24}$ (over 16 million) colors. Each of these unique colors may be plotted as discrete locations on the three-dimensional color cube.

The total number of colors in an image, or data characteristics in a data set in general, may be reduced using a process known as color quantization, which enables the color information from a true color image to be conveyed with fewer bits than that used for the original image. In a typical quantization, all of the colors in a true color image are modified, or mapped, to a data structure such as a color palette, or color look up table (CLUT), wherein each of the $2^{24}$ unique colors are mapped to one of the colors in the CLUT. In one form, the CLUT includes 256 unique colors. Using such a color palette, the CLUT's 256 colors are indexed using integer numbers ranging from zero to 255. All of the colors actually present within a true color image are mapped to one of the 256 colors in the CLUT, which allows the colors from the true color image to be stored using only eight bits per pixel. While some color resolution may be lost during the quantization process, careful selection of the colors to be represented in the palette can minimize the impact on final image quality. For example, an analysis of the colors present in an image can be used to create an adaptive palette, which is a palette for which the selected colors to be used for quantization of an image are tuned to that particular image.

One method for selecting the colors in the CLUT is known as the popularity algorithm. This method determines which colors appear most often in the image, and these colors are chosen as the entries for the CLUT. After the CLUT entries are chosen, each of the unique colors in the original image is mapped to one of the colors selected as a CLUT color entry. Ideally, each unique color should be mapped to the CLUT entry nearest to that unique color on the three-dimensional color cube, which would provide the closest approximation of that unique color. However, computing the absolute Cartesian distances between each unique color as mapped on the color cube and each of the CLUT entries for each individual pixel requires significant computational processing and large amounts of memory. There has not heretofore been proposed an efficient method for mapping pixels to the nearest CLUT entry.

To determine which CLUT entry to associate with each pixel, a method known as the median-cut algorithm has been used. Using this method, the three-dimensional color cube is divided such that each CLUT color entry represents an equal number of pixels in the image. This is accomplished by creating a histogram of color values for each axis, and dividing the cube at the centers of this histogram using a plane orthogonal to that axis such that equal numbers of pixels remain on either side of the plane. This process is repeated for each axis until the color cube is divided into enough volumes to fill the CLUT. A CLUT entry is then assigned to each volume by computing the average of all the pixel values in that volume. Then, when quantizing the image, each pixel is mapped to the CLUT entry for the volume in which that pixel is located, thus approximating the closest CLUT entry for each pixel.

This approximation significantly reduces the processing that would be needed if absolute distances were determined for each pixel. However, because of the use of dividing planes orthogonal to the axes, the volumes associated with each CLUT entry are shaped in the form of a parallelepiped. Thus, pixels located in the outer corners of the volumes may in fact be closer to a CLUT entry corresponding to an adjacent volume, resulting in a less accurate color quantization.

Another limitation of this approach is that the dividing planes are only formed orthogonal to one of the three axes. In an actual image, the concentration of pixel locations do not necessarily align perfectly with these axes. It has been proposed to analyze the densities of pixel locations in the color cube, and to rotate the axes so that the sides of the volumes better align with the layout of the pixels. Although this provides some improvement, it does not overcome the fundamental problem associated with dividing the color cube into volumes having sides that are all aligned in the same directions.

Thus, a disadvantage of the existing algorithms for data quantization is that they fail to correctly demarcate boundaries between areas in the data space that are mapped to data structure entries—in the case of color image processing, for example, they ineffectively map the original image pixels to the selected CLUT entries. It is far too processor-intensive to determine the absolute distances between each discrete location and the CLUT entries on the color cube in order to identify the closest CLUT entry. On the other hand, using only the rough geometric approximation of the median-cut algorithm requires less computation, but may result in inferior image quality.

Accordingly, there is a need for improved data quantization methods and apparatuses for data sets originating from collected data, such as color images and other data sets, which minimize the computational loads while accurately preserving the data quality in the modified data space.

SUMMARY

According to one aspect of the present invention, the foregoing needs are addressed by a computer-readable medium encoded with a computer program which, when loaded into a processor, is operative to perform a method for quantizing a data set having a plurality of dimensions defined by perpendicular axes. The data set includes a plurality of data points, and each data point has a data characteristic. The method includes the steps of selecting a predetermined number of data classes based on a distribution of the data characteristics of the plurality of data points within the data set, the predetermined number of data classes less than the number of data points; forming a data structure based on the predetermined number of data classes; and resolving each of the plurality of data points into one of the predetermined number of data classes using a method, which includes locating a plurality of region centers within the data set, each region center associated with one of the predetermined number of data classes; representing formation of a plurality of regions within the data set by iteratively expanding a predetermined geometric representation from each region center radially outward, each iteration of expansion of the predetermined geometric representation occurring by an integer unit of measure, the iterative expansion causing adjacent regions to form region boundaries, the region boundaries permitted to be non-parallel to the perpendicular axes; and after each iteration of expansion, assigning a value to each of the unassigned data points within each region, the assigned value associated with the predetermined data class of a particular region center, the particular region center being the region center associated with the first region to capture the data point during the iterations of expansion. The resolved data points are associated with the data structure, and, using the associated resolved data points, a modified representation of the data set is generated.

According to another aspect of the present invention, a method for receiving and quantizing a data set originating from collected data is provided. The data set has a plurality of dimensions defined by perpendicular axes, and includes a plurality of data points. Each data point has a data characteristic. The method includes the steps of: receiving the data set; selecting a predetermined number of data classes based on a distribution of the data characteristics of the plurality of data points within the data set, the predetermined number of data classes less than the number of data points; forming a data structure based on the predetermined number of data classes; and resolving each of the plurality of data points into one of the predetermined number of data classes using a method, which includes the steps of locating a plurality of region centers within the data set, each region center associated with one of the predetermined number of data classes; representing formation of a plurality of regions within the data set by iteratively expanding a predetermined geometric representation from each region center radially outward, each iteration of expansion of the predetermined geometric representation occurring by an integer unit of measure associated with a data point, the iterative expansion causing adjacent regions to intersect and form region boundaries, the region boundaries permitted to be non-parallel to the perpendicular axes; and after each iteration of expansion, assigning a value to each of the unassigned data points within each region, the assigned value associated with the predetermined data class of a particular region center, the particular region center being the region center associated with the first region to capture the data point during the iterations of expansion. The resolved data points are associated with the data structure, and, using the associated resolved data points, a modified representation of the collected data is generated.

In a further embodiment, the collected data may be an image captured by an image-collecting device, a seismic measurement of a geographic area, a measurement of an architectural structure, or a measurement of a manufactured device.

In accordance with a further aspect of the present invention, an apparatus for quantizing a data set having a plurality of dimensions defined by perpendicular axes, and including a plurality of data points, each data point having a data characteristic, is provided. The apparatus includes a computer-readable storage medium, and a processor responsive to the computer-readable storage medium and to a computer program. When loaded into the processor, the computer program is operative to perform a method including the steps of selecting a predetermined number of data classes based on a distribution of the data characteristics of the plurality of data points within the data set, the predetermined number of data classes less than the number of data points; forming a data structure based on the predetermined number of data classes; and resolving each of the plurality of data points into one of the predetermined number of data classes using a method including the steps of: locating a plurality of region centers within the data set, each region center associated with one of the predetermined number of data classes; representing formation of a plurality of regions within the data set by iteratively expanding a predetermined geometric representation from each region center radially outward, each iteration of expansion of the predetermined geometric representation occurring by an integer unit of measure associated with a data point, the iterative expansion causing adjacent regions to intersect and form region boundaries, the region boundaries permitted to be non-parallel to the perpendicular axes; and after each iteration of expansion, assigning a value to each of the unassigned data points within each region, the assigned value associated with the predetermined data class of a particular region center, the particular region center being the region center associated with the first region to capture the data point during the iterations of expansion. The resolved data points are associated with the data structure, and, using the associated resolved data points, a modified representation of the data set is generated.

BRIEF DESCRIPTION OF THE DRAWINGS

FIG. 3a is a table illustrating a three-dimensional array in accordance with the present invention.

FIG. 3b illustrates a data structure, in particular a color look-up table, in accordance with aspects of the present invention.

DETAILED DESCRIPTION OF THE PREFERRED EMBODIMENTS

A data set to be quantized, which includes a number of data points and has a number of dimensions defined by perpendicular axes, may originate from a variety of collected data. Examples of collected data resulting in data sets that may benefit from quantization include, but are not limited to: images captured by image-collection devices such as digital imaging devices (e.g., cameras/recorders), medical devices such as computed tomography scanners, magnetic resonance imaging systems, ultrasounds, position emission tomography systems and the like; measurements (e.g., seismic measurements) of geographic areas, which may, among other things, describe geothermal data, and underground rock formations or deposits of various materials such as oil and natural gas; measurements (e.g., electronic measurements) of items such as architectural structures or manufactured parts, which may be further modeled, for example, using computer techniques such as computer-aided design or computer-aided manufacture; environmental measurements; and any other measurements or collected data comprising an intangible representation of physical objects, activities or phenomena.

Figure 1:
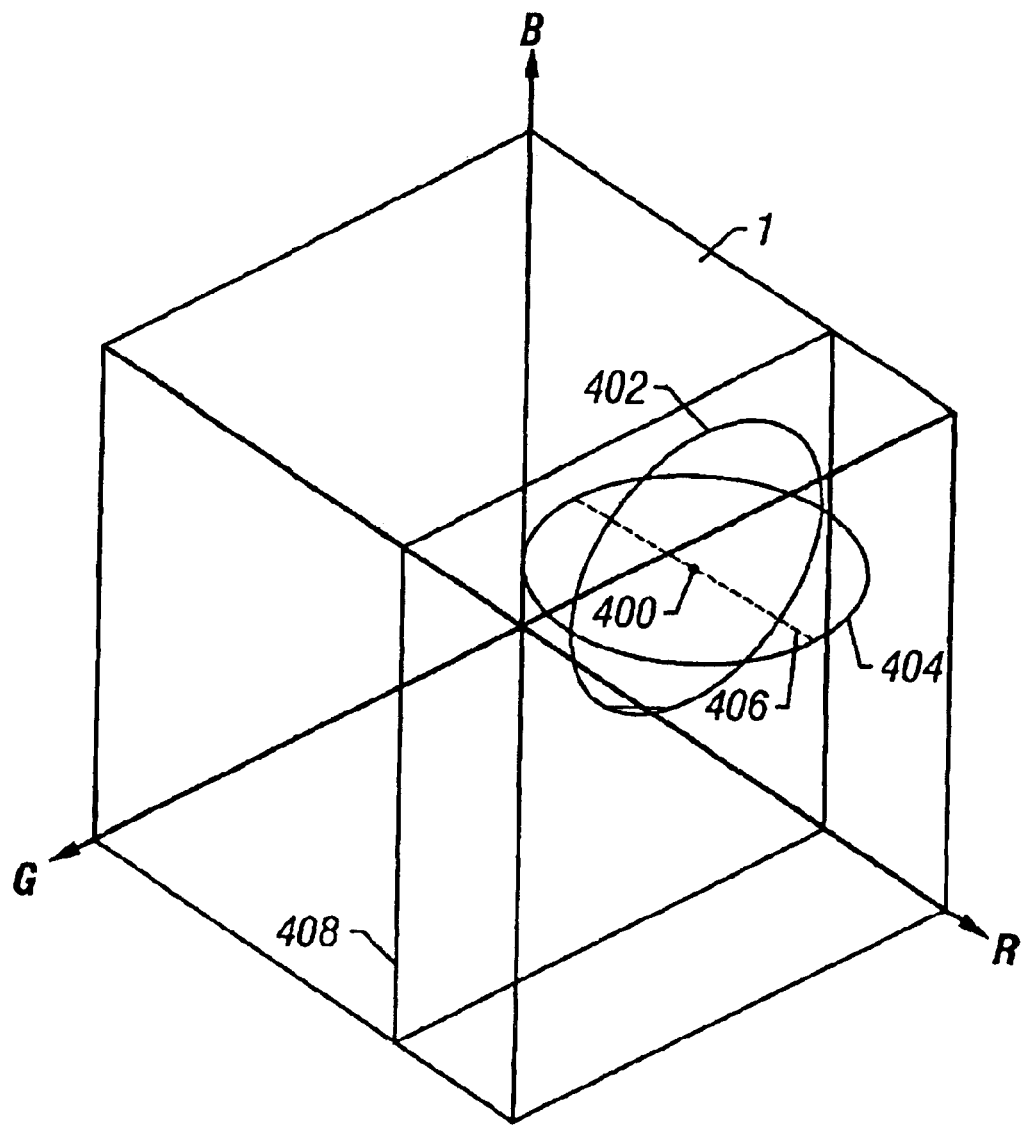
FIG. 1 shows a three-dimensional color cube for illustrating a data quantization method applied to a color image in accordance with one aspect of the present invention.

In the case of a data set that is a color image, which is discussed for purposes of illustration and not limitation herein, the data points are pixels, and have a particular data characteristic—color—which often benefits from quantization to reduce bandwidth required for storage or transmission of the image. As shown in FIG. 1, pixels from the image are plotted on a three-dimensional color cube 1, each axis of color cube 1 representing a variable in a color model, such as the red, green, and blue (RGB) axes. Although the following embodiment utilizes the RGB color model, it will be understood that any color model may be used. The color components for each pixel of the digital image are stored as true color values, wherein the color components for each pixel are located along each of the three axes. For the case of 24-bit true color, eight bits are used to identify each pixel's color component location along each axis, and each axis is divided into increments numbered 0–255, thus dividing the entire cube into $2^{24}$ discrete cubic locations.

The color cube is divided into a plurality of data classes, such as volumes, to determine the associations between the discrete locations and the entries in a data structure such as a color look-up table (CLUT). Although any number of data classes could be selected, it has been found that 256 volumes provide good color rendition while requiring only an 8-bit value. After the 256 colors for the entries in the CLUT are determined, these 256 colors are plotted on the three-dimensional color cube as 256 unique region centers, or simply volume center points in the example described herein. Region centers may be located for any number of two or more dimensions—for example, for two-dimensional data sets, circles centered about region centers may be represented, and for geometries higher than three dimensions, a correlating geometric representation, such as a hypersphere, may be used. In the example provided herein, sphere center points are selected.

Any of a number of well-known methods can be used for selecting the colors to be used as the CLUT entries for this image, although to achieve resulting boundaries separating the selected color regions that are closer to optimal, it is useful to employ the data quantization methods and apparatuses set forth herein. It will also be understood that any color conversion ratio may be used, and the conversion from 24-bit true color to an 8-bit CLUT value is for exemplary purposes only.

In accordance with aspects of the present invention, each of the data points in a particular data set is resolved into one of the predetermined data classes. The process generally includes representing the formation, and boundaries, of regions within the data set by iteratively expanding a particular geometric representation from each selected region center radially outward, and associating the data points falling within that geometric representation with the predetermined data class associated with the particular region center. Each iteration of expansion grows the geometric representation by an integer unit of measure, such as an integer unit that corresponds to the size of one or more data points. In the example provided herein, a sphere-creating process is performed for associating all of the discrete locations in the color cube with one of the volume center points, wherein the color of each center point is selected as a CLUT entry. A sphere centered about each center point is created, and all of the discrete locations falling within that sphere are associated with the CLUT entry corresponding to its center point. The radius of each sphere is then increased by one increment (a pixel width) and the association process is repeated.

At a certain point, the surfaces of the geometric representations such as the spheres will begin to intersect the surfaces of adjacent geometries. Each discrete location is associated with exactly one center point, and once the association is established, that association is not overwritten. Thus, as the spheres continue to grow and overlap, the overlapping portions are not considered when associating additional discrete locations.

As understood from minimal surface theory, the smallest interface between two spheres is a plane. Thus, as two spheres from adjacent volume center points increase in size and begin to intersect, the intersection forms a plane orthogonal to the line connecting the two center points. By using that plane to determine the proper CLUT association, this method more accurately associates each discrete location with the closest center point. Unlike other methods of CLUT association, which create parallelepiped-shaped volumes having sides that are parallel to the axes of the color cube, the color conversion process in accordance with this aspect of the present invention creates volumes whose borders may be located in any orientation to more accurately associate the discrete locations with the closest center points.

The formation of the spheres can be performed using a variation of conventional circle forming algorithms, which are often used to create circles and curves in a bitmap image or for raster display. Incremental methods and integer arithmetic are used to minimize the number of calculations to be performed and to s eliminate the need for floating-point calculations. While the sphere creation is performed in three-dimensions, the two-dimensional circle creation illustrated in FIGS. 2a–2f will be discussed first.

Figure 2A:
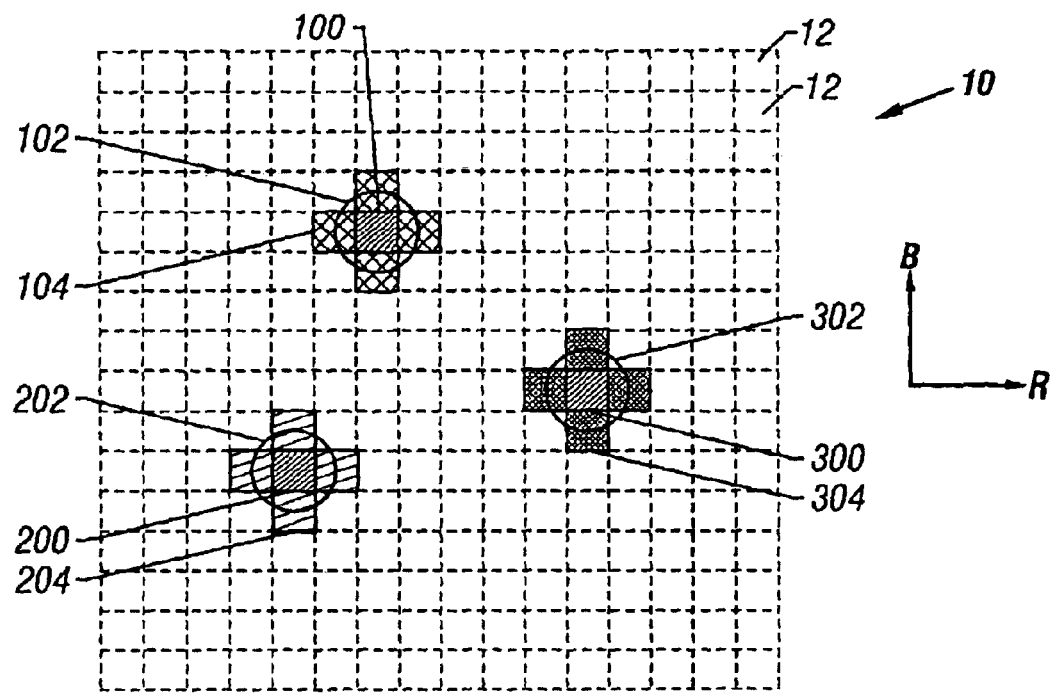
FIGS. 2a–2f show via two-dimensional circle-creating steps the process of associating data points such as pixels with region centers in accordance with aspects of the present invention.

FIG. 2a illustrates a two-dimensional array 10 of discrete locations 12, wherein each discrete location 12 represents a location on the three-dimensional color cube and array 10 represents a portion of a plane of the color cube in the B-R direction. Volume center points 100, 200, and 300 are located within array 10. Note that FIGS. 2a–2f are for exemplary purposes, and that in practice the center points may not necessarily fall in the same plane and may not be so closely spaced. All other discrete locations 12 in array 10 are provided with a default setting indicating that they have not yet been associated with any center points. This is shown in FIGS. 2a–2f by the absence of shading in each location 12. When implemented on a computer system, each location in the color cube may be associated with CLUT mapping value, in which the default value is "minus one", and after the location is associated with an center point, the value may be switched
to a CLUT value. To associate a location with a center point, the CLUT value corresponding to that center point is stored as the CLUT mapping value for that location. When all of the locations contain an associated CLUT value, the color cube mapping is complete.

An array of one-bit values can be used as an alternative method for monitoring the associations of discrete locations 12. This array contains a default value of "0" for each discrete location 12 in the color cube. As each location 12 is associated with a CLUT mapping value, the value corresponding to that discrete location 12 is changed to "one." This array therefore provides a simple method for monitoring the associations.

Around each center point 100, 200, 300 circles 102, 202, 302 are formed. Circles 102, 202, 302 are centered about each of the volume center points 100, 200, 300 and have a radius of one unit equal to the width of one discrete location 12. Circles 102, 202, 302 are formed using any of a number of well-known circle forming algorithms for displaying arcs or circles on raster displays. Exemplary methods are described in Computer Graphics: Principles and Practice, James D. Foley et al. (Addison-Wesley Publishing Company 1996), which is incorporated herein by reference in its entirety.

In FIGS. 2a–2f, as the circles 102, 202, 302 are drawn around center points 100, 200, 300, and all of the locations 12 contained within these circles 102, 202, 302 are associated with the appropriate center point 100, 200, 300. Various methodologies may be used for determining whether a location 12 falls "within" a circle. In the embodiment shown in FIGS. 2a–2f, any location 12 whose center point falls either on or within the border of a given circle is marked as falling "within" that circle. An alternative method would identify any location 12 whose volume falls more than 50% within the border of a given circle as being "within" that circle.

In FIG. 2a, the border of circle 102 crosses through the center points of four adjacent locations 12, and these are marked as associated locations 104. Associated locations 204 and 304 are also shaded to indicate that they fall within—circles 202 and 302, and are associated with volume center points 200 and 300, respectively.

Figure 2B:
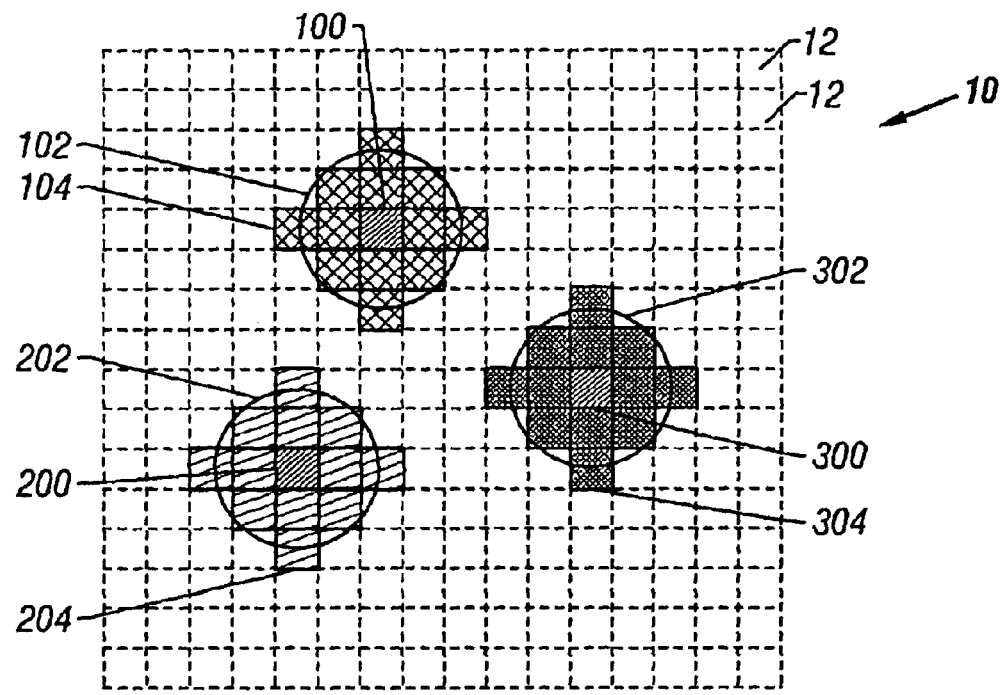

In FIG. 2b, the radii of circles 102, 202, 302 are increased by an increment equal to the width of one discrete location 12. All of the discrete locations 12 located within these newly enlarged circles 102, 202, 302 are identified and checked to determine whether they have already been associated with another volume center point. The eight additional locations 12 surrounding volume center point 100 that have not already been associated in FIG. 2a are marked as associated locations 104, and the 24-bit colors represented by those locations 104 are mapped to, or associated with, the color represented by center point 100. The same process is performed on the eight additional locations 204 located within circle 202 and the eight additional locations 304 located within circle 302.

Figure 2C:
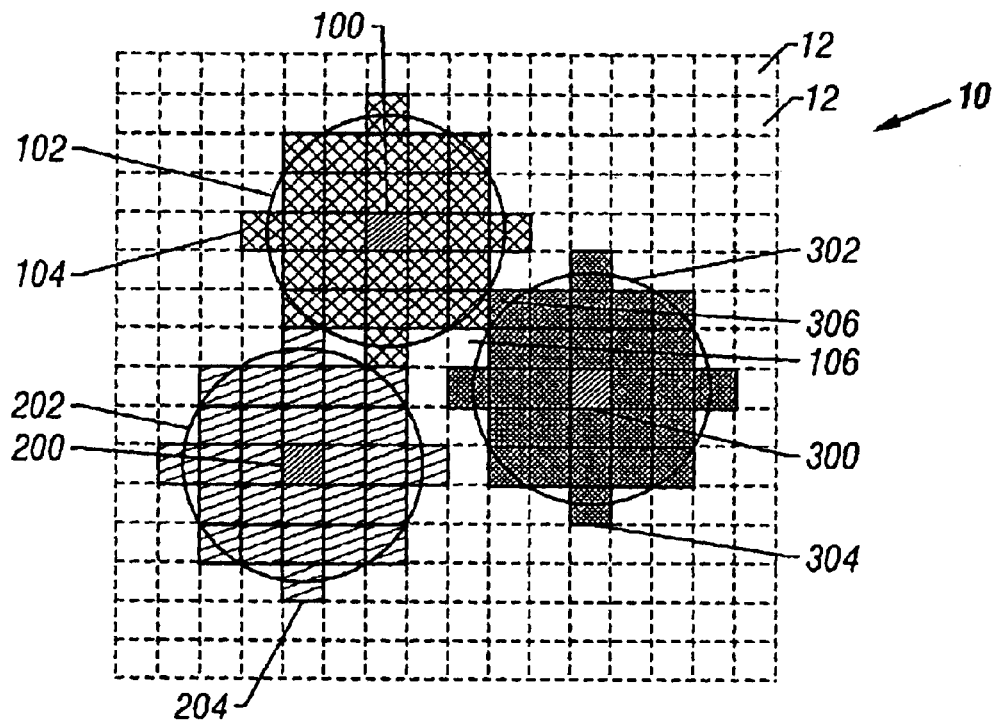
Figure 2D:
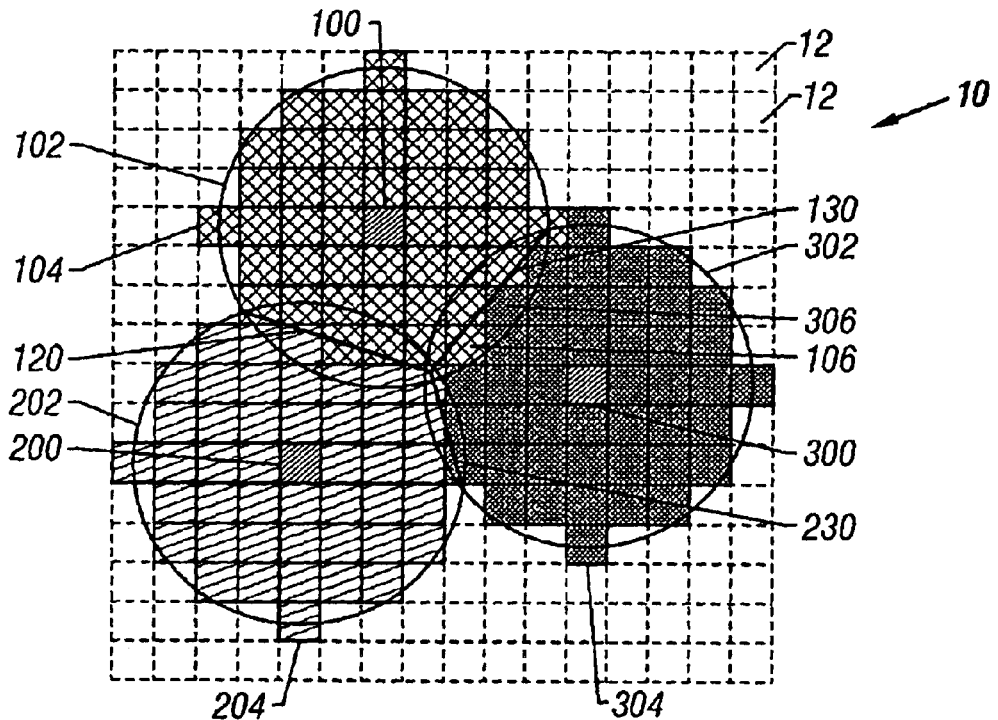

The radii of circles 102, 202, 302 are again incrementally increased by one unit, and the location association process is repeated, as shown in FIG. 2c. In FIG. 2d, the radii of circles 102, 202, 302 are increased another unit. At this point, circles 102, 202, 302 begin to overlap. Looking specifically at the overlap between circles 102 and 302, a theoretical line 130 is formed between center point 100 and center point 300. This theoretical line 130 is a line equidistant at all points to both center point 100 and center point 300, and using the method according to the present invention, the associations of discrete locations 12 with center point 100 and center point 300 will be demarcated by this line. Similar theoretical lines 120, 230 are formed at the interface between circles 102 and 302 and circles 202 and 302, respectively. As can be seen in FIG. 2d, these lines, which represent the proper division between the CLUT value associations, are not parallel to either axis in array 10. Had these lines been approximated using lines parallel to these axes, the resulting image color quality may degrade.

Looking closely at discrete location 306, one can see that location 306 falls within circle 102, yet is marked as a member of group 304, indicating that location 306 is associated with the CLUT value corresponding to center point 300. This is because in the previous association step shown in FIG. 2c, location 306 had already been associated with the CLUT value corresponding to center point 300. This association is carried over to later iterations of the circle-creating process.

Location 106 presents a different situation. In the previous step shown in FIG. 2c, location 106 remained unassociated with any CLUT value. In the following step, location 106 fell within both circle 102 and circle 302. The association for location 106 can be determined by following the order of circle processing. Although in each iteration of the circle-creating process, the radii of all of the circles in array 10 are incrementally increased, the calculation and processing for each circle takes place sequentially. Thus, although each iteration shown in FIGS. 2a–2f involves the incremental increase in all three circles 102, 202, 302, when the circle-creating calculation is performed on a computer, these circles are processed serially, the radius of circle 102 being increased first and the new discrete locations 12 falling within the enlarged circle 102 are associated with center point 100. This is then followed by an increase in the radii of circle 202 and then circle 302. Thus, the discrete locations 12 are preferentially associated with center point 100 over center points 200 and 300. For this reason, location 106 becomes a member of group 104 and is associated with center point 100 first. Once this association is established, location 106 does not become re-associated if it later falls within other circles.

As illustrated by the mapping of location 106 in FIG. 2d, the determination of the order in which the circles are processed may alter the CLUT value associations, and may thus impact the quality of the image. Various methods can be used for determining the order in which the spheres are created and processed.

In one embodiment, the center points are processed in the order they appear in the CLUT, without regard for the particular colors represented. In another embodiment, the center points may be ordered such that those with the highest histogram counts are processed first. Other methodologies include ordering the center points from brightest to darkest or starting with the center points closest to the center of the color cube and proceeding with the center points increasingly farther from the center.

Figure 2E:
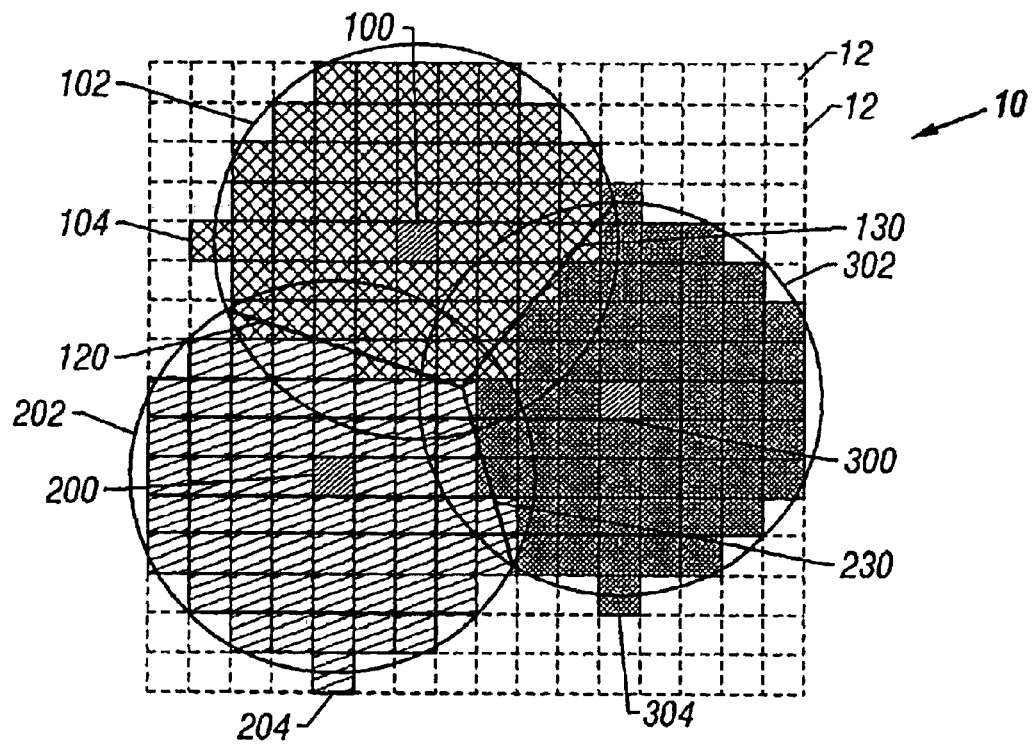
Figure 2F:
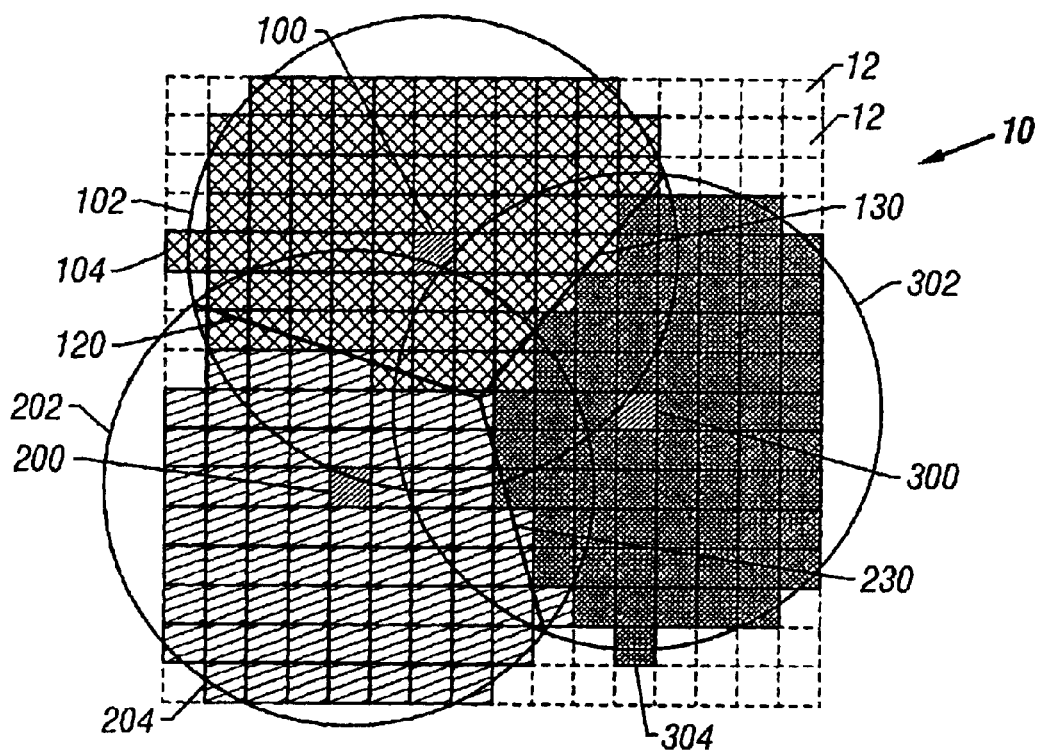

FIGS. 2e–2f illustrate successive iterations of the circle-creating process. This process is repeated until all discrete locations 12 are associated with exactly one CLUT value.

The circle-creating process illustrated in FIGS. 2a–2f is a two-dimensional part of the overall sphere-creating process in accordance with the present invention. FIG. 1 shows a volume center point 400 plotted in color cube 1. Circle 402 centered about center point 400 is formed in plane 408, as described above with respect to FIGS. 2a–2f. Plane 408 is a plane in color cube 1 parallel to the B-G plane. A corresponding circle 404, also centered about center point 400, is formed parallel to the G-R plane with a radius equal to the radius of circle 402. The discrete locations 12 falling within circle 402 are processed in the B-G plane and associated with center point 400 as described above. To create a sphere about center point 400, multiple layers of circles are formed in parallel planes, each circle being centered about an axis parallel to one of the primary RGB axes, as will be described below.

In FIG. 1, axis 406 is parallel to the R-axis and passes through center point 400. Multiple layers of circles centered on axis 406 and parallel to circle 402 are created, each layer being separated from adjacent layers by one unit. Each circle on layers on either side of circle 404 has an increasingly smaller radius determined by circle 402. By repeatedly performing the circle-creation process, a sphere centered about center point 400 is effectively created using well-known circle drawing methods. For simplicity, only one center point 400 is shown in FIG. 1. It will be understood that in practice, the color cube will be filed with a plurality of volume center points. As the spheres around the center points enlarge, the circles forming the spheres will begin to intersect and form planes similar to lines 120, 130, 230 in FIGS. 2d–2f. As taught by minimal surface theory, these planes will form the minimal intersection between the spheres. Because these circle-drawing methods use simple integer calculations, the amount of processing required for creating each sphere is minimal. However, this process advantageously creates volumes in a color cube whose sides more precisely associate the discrete locations with the closest center points.

The order and method by which the spheres are processed can be varied in accordance with the present invention. In one embodiment, all of the parallel circles forming a single sphere about a center point are created, and the discrete locations falling within all of those circles are associated with that center point. The entire process is repeated for each successive center point until the spheres formed around all of the center points have the same radius. Thus, each sphere about each center point is fully formed in three-dimensions before the processing proceeds to the next center point.

In another embodiment, the circle processing for all of the center points is performed in a single plane. After all of the circles about each center point in that plane are processed, the circle-creating process is repeated in a parallel plane.

The CLUT value associations for all of the discrete locations in the color cube may be stored in a three-dimensional array. In one embodiment of the present invention, the CLUT value associations are stored in a three-dimensional array of "short" variables, which are two-byte integer variables, and this array is additionally used in conjunction with an image dithering function. For a 24-bit color image, the three-dimensional array would be a 256×256×256 array, wherein each entry includes an eight-bit upper byte containing the CLUT value association and an eight-bit lower byte containing a set of bit flags as will be described in the example below.

The first bit in the eight-bit lower byte is an association value, which identifies whether the color cube location has already been associated with one of the expanding spheres. A "0" value indicates that the discrete location has not yet been associated with any CLUT entry, and a "1" value indicates that an association has already been established.

The second bit is an edge detection value and marks discrete locations corresponding to color values selected using an edge detection algorithm on the original image. This edge detection algorithm determines which pixels reside along the edge of a color change in an image and gives those colors a priority for display. This algorithm is used during the initial volume selection process to help preserve colors used to describe image detail.

The next two bits are dithering values are used for marking the location as a candidate for a color dithering function. Numerous techniques for color dithering are known for improving the quality of a displayed image using digital halftoning. In accordance with this embodiment, these two bits are used to identify which locations will be subject to dithering in the final displayed image. A "11" indicates that the location is a center point, and therefore would not be available for dithering. A "00" indicates that a particular location is not available for dithering, and a "01" indicates that the location is available for dithering. Finally, a "10" indicates that the location is available for dithering if the distance from the location to the center point of the sphere containing that location is greater than a certain value. This minimum distance value is contained within the final four bits in the lower byte. Requiring that a discrete location be a minimum distance from the center point before it is made available for dithering allows the dithering process to be limited to large spheres, where the need for dithering may be the greatest.

This three-dimensional array is illustrated in tabular form in FIG. 3a. In this embodiment, each discrete location 12 is identified by a 24-bit value, listed in FIG. 3a in the "Discrete Location" column. Corresponding to each discrete location is a "Mapping Value" stored in the upper eight bits of the short variable. This mapping value is an 8-bit value corresponding to one of the 256 entries in the color look-up table, shown in FIG. 3b. Each of the CLUT entries in FIG. 3b is associated with one of the volume center points, and the color of that volume center is stored as a 24-bit value in the "Display Color" column of the CLUT. As the sphere-creating process proceeds and discrete locations are associated with one of the CLUT entries, that CLUT entry value is stored as a mapping value corresponding to that discrete location. The third column in FIG. 3a stores bit flags for each discrete location, as described above.

After all of the discrete locations in the color cube are mapped to exactly one of the CLUT values, the colors in the bitmap image to be converted are processed using the CLUT value associations. Each pixel in the input bitmap image contains a true color value that corresponds to a location on the color cube. As described above, this true color value may be represented by a 24-bitcolor value. This true color value is replaced with the CLUT mapping value corresponding to the associated volume center point. The CLUT value may, for example, be an 8-bit CLUT mapping value identifying one of the 256 values in the CLUT.

When the bitmap image is displayed on a raster screen, the CLUT and the 8-bit color values are loaded into the video processor. The image bitmap is then output and displayed using only the colors present in the CLUT. Where an 8-bit value is used for the CLUT mapping value, as described above, a total of 256 unique colors can be used to display the image. This image may be further augmented using a dithering process in conjunction with the dithering value stored in the memory array as described above.

Figure 4:
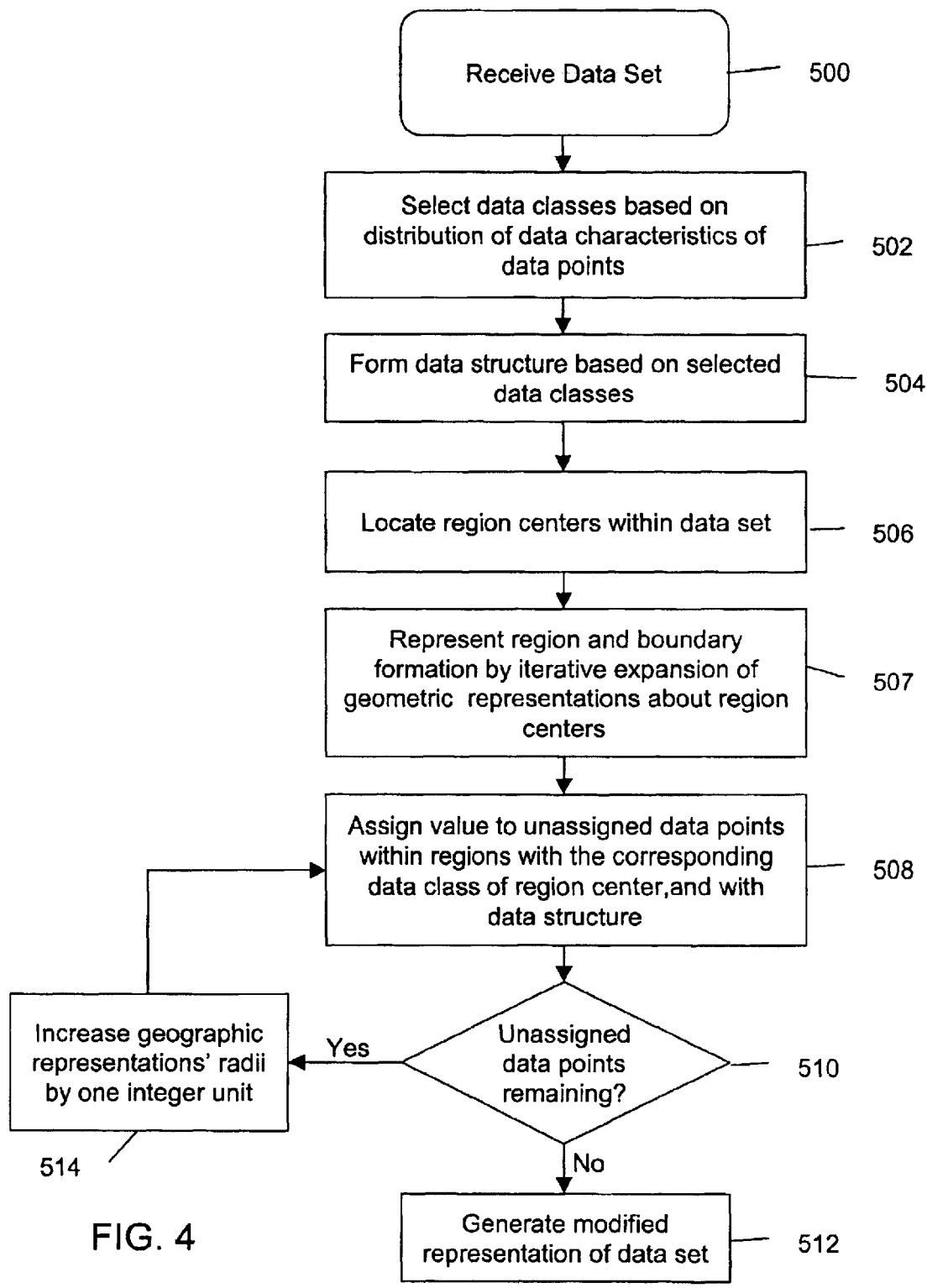
FIG. 4 a flowchart of a data quantization process in accordance with the present invention.

FIG. 4 is a flowchart of a data quantization process in accordance with an aspect of the present invention. In step 500, a data set is received. The data set originates from collected data, has a plurality of dimensions (e.g., three) defined by perpendicular axes, and includes a plurality of data points. Each data point has at least one data characteristic. In step 502, a predetermined number of data classes is selected based on a distribution of a particular data characteristic of the data points. In step 504, a data structure is formed based on the selected data classes. Steps 506, 507, 508, 510 and 514 describe a method for resolving each of the data points into one of the selected data classes. In step 506, region centers are located within the data set. Each region center is associated with one of the selected data classes. At step 507, the formation of regions and region boundaries within the data set is represented, by iteratively expanding geometric representations radially outward from each region center. In step 508, the unassigned data points falling within each expanding region are assigned a value associated with the data class of the particular region center associated with the region in which the data points fall, and ultimately with the data structure. In 510, a determination is made as to whether unassigned data points still remain in the data set. If so, then each of the regions is increased in size by increasing the geometrical representations' radii by one integer unit in step 514, and step 508 is repeated. If no other unassigned data points remain, then a modified representation of the collected data is generated based on the resolved data points. When used in the context of an image color conversion process, the process reduces a raster image data file from n possible colors for each pixel (n being the total number of discrete locations within the color cube) to m total colors in the output data file (m being the number of colors in the CLUT). Typically, $n=2^{24}$ for a 24-bit true color image and m=256 for an 8-bit frame buffer system. However, the conversion process in accordance with the present invention may be generalized to any set of values for n>m>1.

Figure 5:
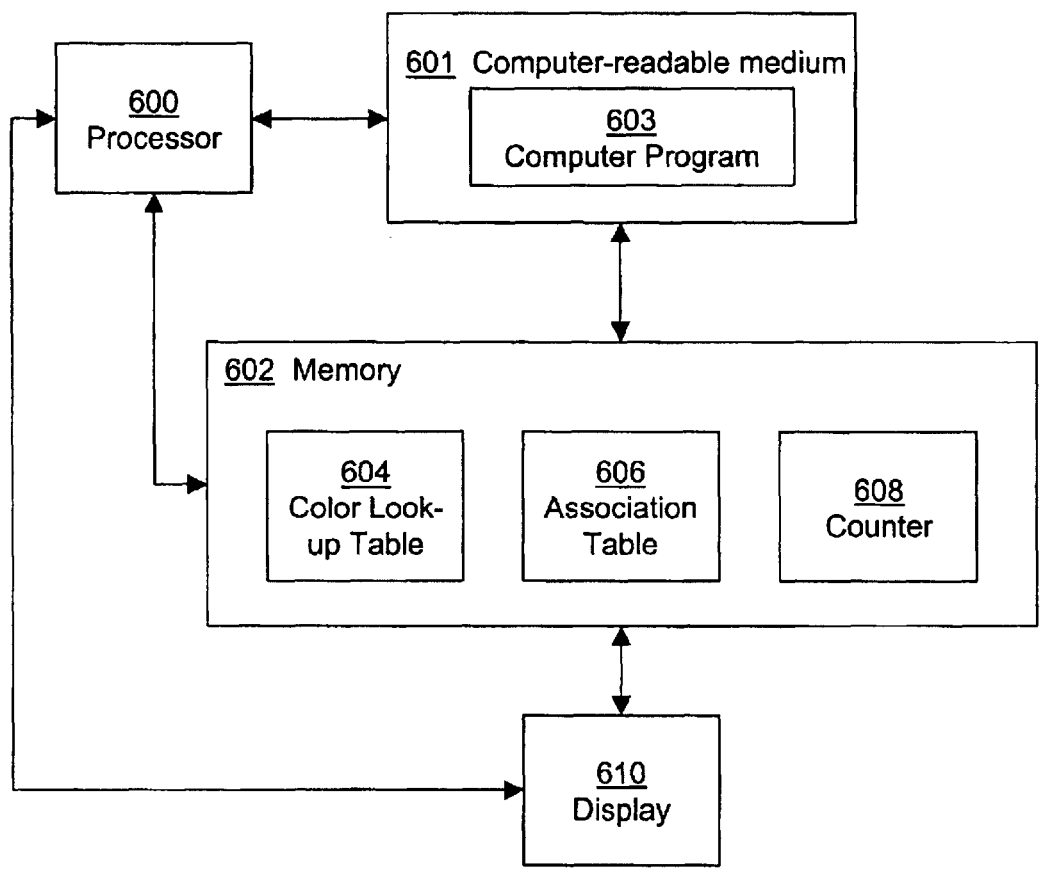
FIG. 5 is a block diagram of a computer system in accordance with the present invention.

FIG. 5 shows a block diagram of a computer system implementing a data quantization process in accordance with aspects of the present invention. A processor 600 is communicating with a computer-readable medium 601, display 610, and a memory 602, which contains a data structure (CLUT 604), association table 606, and counter 608. CLUT 604 includes entries for each of its indices and their respective true colors. Association table 606 includes entries for all of the discrete locations in color cube 1, as well as their CLUT mappings. Alternatively, association table 606 may be reduced to only include entries for the pixels that actually exist in the image to be converted, which is likely to be considerably less than the $2^{24}$ discrete locations that exist in the color cube. Counter 608 may be used to keep track of the unassociated discrete locations remaining as the sphere creating process proceeds. Computer-readable medium 601, which may be any suitable medium such as memory 602, is in communication with processor 600 and memory 602, and is encoded with a computer program 603, which is operative to perform the quantizing methods described herein, including implementation of the method set forth in the flowchart of FIG. 4. The converted data set may be displayed on display 610, or output to another destination or device (not shown).

It will be understood that multiple storage media, processors and configurations of such devices are possible, such devices and configurations being well-known and widely available. The methods described herein may be implemented computer software, firmware, hardware (e.g., application-specific integrated circuits), or any combination thereof. Aspects of the invention are not limited to any specific embodiments of computer programs or signal processing methods.

Computer program instructions operative to perform a method for resolving a data set, particularly a three-dimensional color image, into a predetermined number of data classes, such as a CLUT, in accordance with the aspects of the present invention set forth herein may be modeled using the following pseudo-code:

For (each input pixel in the image) {
  Read an input pixel RGB value
  //R is the input pixel red component
  //G is the input pixel green component
  //B is the input pixel blue component
  //Ci is the CLUT index for this input pixel
  Ci=Color Space Array[R][G][B]
  Write Ci to output //file or memory
}

Although the invention has been described with reference to particular embodiments, the description is only an example of the invention's application and should not be taken as a limitation. In particular, even though the circle-creating process described used radius increments of one unit equal to the width of a single discrete location 12, alternative embodiments of this invention may use increasing radii of various lengths. In addition, the color conversion process is not limited to the conversion of 24-bit images to 8-bit images; any size image can be reduced to any size color palette. Various other adaptations and combinations of features of the embodiments disclosed are within the scope of the invention as defined by the following claims and their equivalents.

What is claimed is:

1. A computer-readable medium encoded with a computer program which, when loaded into a processor, is operative to perform a method for quantizing a data set having a plurality of dimensions defined by perpendicular axes, the data set comprising a plurality of data points, each data point having a data characteristic, the method comprising the steps of:

selecting a predetermined number of data classes based on a distribution of the data characteristics of the plurality of data points within the data set, the predetermined number of data classes less than the number of data points;

forming a data structure based on the predetermined number of data classes;

resolving each of the plurality of data points into one of the predetermined number of data classes using a method comprising:

locating a plurality of region centers within the data set, each region center associated with one of the predetermined number of data classes;

representing formation of a plurality of regions within the data set by iteratively expanding a predetermined geometric representation from each region center radially outward, each iteration of expansion of the predetermined geometric representation occurring by an integer unit of measure, the iterative expansion causing adjacent regions to form region boundaries, the region boundaries permitted to be non-parallel to the perpendicular axes; and after each iteration of expansion, assigning a value to each of the unassigned data points within each region, the assigned value associated with the predetermined data class of a particular region center, the particular region center being the region center associated with the first region to capture the data point during the iterations of expansion;

associating the resolved data points with the data structure; and using the associated resolved data points, generating a modified representation of the data set.

2. The computer-readable medium according to claim 1, wherein the data set comprises a first digital color image received by the processor and the modified representation of the data set comprises a second digital color image output from the processor.

3. The computer-readable medium according to claim 2, wherein the step of generating a modified representation of the data set further comprises:

replacing the data characteristic of a particular data point in the first digital color image with the assigned value to form the second digital color image; and displaying the second digital color image using the assigned values of the particular data point.

4. The computer-readable medium according to claim 1, wherein the number of dimensions is three, and the geometric representation comprises a sphere.

5. The computer-readable medium according to claim 4, wherein each data point comprises a pixel and the data characteristic comprises a pixel color.

6. The computer-readable medium according to claim 5, wherein the step of selecting a predetermined number of data classes comprises generating a color look-up-table based on a frequency of a particular pixel color occurring in the first digital color image.

7. The computer-readable medium according to claim 6, wherein the step of generating the color look-up table comprises:

dividing the first digital color image into a plurality of bins each having a subset of n discrete locations;

determining a color center for each of the plurality of bins, the color centers comprising the region centers; and assigning each color center to a mapping value in a color look-up table.

8. The computer-readable medium according to claim 7, wherein $n=2^{24}$, and the number of bins is 256.

9. The computer-readable medium according to claim 6, wherein the step of assigning a value to each of the unassigned data points comprises assigning a value associated with the color look-up table.

10. The computer-readable medium according to claim 9, wherein the integer unit for iteratively expanding the sphere comprises an amount equal to the width of one pixel.

11. The computer-readable medium according to claim 10, wherein the sphere is iteratively expanded until each pixel within the first digital image is disposed within one or more regions.

12. The computer-readable medium according to claim 11, wherein the expansion of each region does not affect the expansion of other regions.

13. The computer-readable medium according to claim 1, wherein the number of dimensions is two, and the geometric representation comprises a circle.

14. The computer-readable medium according to claim 1, wherein the number of dimensions is four, and the geometric representation comprises a hypersphere.

15. The computer-readable medium according to claim 1, wherein the step of associating the resolved data points with the data structure further comprises establishing a memory location associated with each resolved data point.

16. The computer-readable medium according to claim 15, wherein each memory location stores values associated with a particular resolved data point, the values comprising: the assigned value, an assertion value indicating whether the particular data point has been associated with a region center, and a dithering value indicating whether the assigned value is a candidate for dithering.

17. The computer-readable medium according to claim 16, wherein the step of establishing a memory location further comprises maintaining a counter of memory locations not yet having the assigned value.

18. A method for receiving and quantizing a data set originating from collected data, the data set having a plurality of dimensions defined by perpendicular axes, the data set comprising a plurality of data points, each data point having a data characteristic, the method comprising the steps of:

receiving the data set;

selecting a predetermined number of data classes based on a distribution of the data characteristics of the plurality of data points within the data set, the predetermined number of data classes less than the number of data points;

forming a data structure based on the predetermined number of data classes;

resolving each of the plurality of data points into one of the predetermined number of data classes using a method comprising:

locating a plurality of region centers within the data set, each region center associated with one of the predetermined number of data classes;

representing formation of a plurality of regions within the data set by iteratively expanding a predetermined geometric representation from each region center radially outward, each iteration of expansion of the predetermined geometric representation occurring by an integer unit of measure associated with a data point, the iterative expansion causing adjacent regions to intersect and form region boundaries, the region boundaries permitted to be non-parallel to the perpendicular axes; and after each iteration of expansion, assigning a value to each of the unassigned data points within each region, the assigned value associated with the predetermined data class of a particular region center, the particular region center being the region center associated with the first region to capture the data point during the iterations of expansion;

associating the resolved data points with the data structure; and using the associated resolved data points, generating a modified representation of the collected data.

19. The method according to claim 18, wherein the collected data comprises one of: an image captured by an image-collecting device; a seismic measurement of a geographic area; a measurement of an architectural structure; and a measurement of a manufactured device.

20. An apparatus for quantizing a data set having a plurality of dimensions defined by perpendicular axes, the data set comprising a plurality of data points, each data point having a data characteristic, the apparatus comprising:

a computer-readable storage medium; and a processor responsive to the computer-readable storage medium and to a computer program, the computer program, when loaded into the processor, operative to perform a method comprising:

selecting a predetermined number of data classes based on a distribution of the data characteristics of the plurality of data points within the data set, the predetermined number of data classes less than the number of data points;

forming a data structure based on the predetermined number of data classes;

resolving each of the plurality of data points into one of the predetermined number of data classes using a method comprising:

locating a plurality of region centers within the data set, each region center associated with one of the predetermined number of data classes;

representing formation of a plurality of regions within the data set by iteratively expanding a predetermined geometric representation from each region center radially outward, each iteration of expansion of the predetermined geometric representation occurring by an integer unit of measure associated with a data point, the iterative expansion causing adjacent regions to intersect and form region boundaries, the region boundaries permitted to be non-parallel to the perpendicular axes; and after each iteration of expansion, assigning a value to each of the unassigned data points within each region, the assigned value associated with the predetermined data class of a particular region center, the particular region center being the region center associated with the first region to capture the data point during the iterations of expansion;

associating the resolved data points with the data structure; and using the associated resolved data points, generating a modified representation of the data set.

* * * * *

UNITED STATES PATENT AND TRADEMARK OFFICE
CERTIFICATE OF CORRECTION

PATENT NO. : 6,836,563 B2
DATED : December 28, 2004
INVENTOR(S) : Thomas Patrick Dawson It is certified that error appears in the above-identified patent and that said Letters Patent is hereby corrected as shown below:

Column 4,
Line 64, after "FIG. 4," insert -- is --.

Column 6,
Line 52, after "conventional," change "circle forming" to -- circle-forming --.
Line 56, before "eliminate," delete "s".

Column 7,
Line 6, before "CLUT", insert -- a --.
Line 8, before "center", change "an" to -- a --.
Line 23, after "100, 200, 300", insert -- , --.
Line 28, change "well-known circle forming" to -- well known circle-forming --.
Line 34, after "100, 200, 300," delete "and".
Line 50, change "within-circles" to -- within circles --.

Column 9,
Line 27, change "will be filed" to -- will be filled --.

Column 10,
Line 13, before "dithering," delete -- are --.
Line 19, before ""11"", change "A" to -- An --.

UNITED STATES PATENT AND TRADEMARK OFFICE
CERTIFICATE OF CORRECTION

PATENT NO. : 6,836,563 B2
DATED : December 28, 2004
INVENTOR(S) : Thomas Patrick Dawson It is certified that error appears in the above-identified patent and that said Letters Patent is hereby corrected as shown below:

Column 11,
Lines 54-55, change "sphere creating" to -- sphere-creating --.

Column 14,
Line 62, change "and" to -- or --.

Signed and Sealed this

Thirty-first Day of May, 2005

JON W. DUDAS
*Director of the United States Patent and Trademark Office*